United States Patent [19]
Bentley

[11] 3,998,244
[45] Dec. 21, 1976

[54] DRIP IRRIGATION VALVE WITH HELICAL FLOW PATH

[76] Inventor: Clarence Bentley, 9256 Stamps Ave., Downey, Calif. 90240

[22] Filed: Aug. 8, 1975

[21] Appl. No.: 603,142

[52] U.S. Cl. .................. 138/43; 251/121; 251/126; 138/46
[51] Int. Cl.² .......................... F15D 1/02
[58] Field of Search ............. 138/46, 44, 45, 42, 138/43, 37, 178; 239/66, 76, 271, 524, 547, 542, 590, 209, 266–269; 137/605, 517, 98, 226, 461, 459, 458

[56] References Cited
UNITED STATES PATENTS

| | | | |
|---|---|---|---|
| 3,095,006 | 6/1963 | Smith | 138/43 X |
| 3,693,657 | 9/1972 | Olson | 138/43 X |
| 3,729,142 | 4/1973 | Rangel-Garza et al. | 138/42 X |
| 3,780,946 | 12/1973 | Smith et al. | 239/107 |
| 3,806,036 | 4/1974 | Olson | 138/44 X |
| 3,815,636 | 6/1974 | Menzel | 138/43 |
| 3,841,354 | 10/1974 | McDonnell | 138/43 |
| 3,897,009 | 7/1975 | Rangel-Garza et al. | 138/42 X |
| 3,948,479 | 4/1976 | Bedo et al. | 138/42 X |

Primary Examiner—Henry K. Artis
Attorney, Agent, or Firm—Gordon L. Peterson

[57] ABSTRACT

A drip irrigation valve comprising an outer member having a passageway and an inner member mounted in the passageway for axial movement. An axially and circumferentially extending rib is provided on a first of the members and cooperates with a confronting surface of a second of the members to provide a helical flow path. Dams are provided in the flow path to increase the resistance to fluid flow. To increase the flow rate, the members are moved axially to take one or more of the restrictions out of the flow passage. To make the valve pressure compensating, one of the member is resilient and can be resiliently deformed by the fluid at inlet pressure to increase the resistance to flow provided by the restrictions.

33 Claims, 7 Drawing Figures

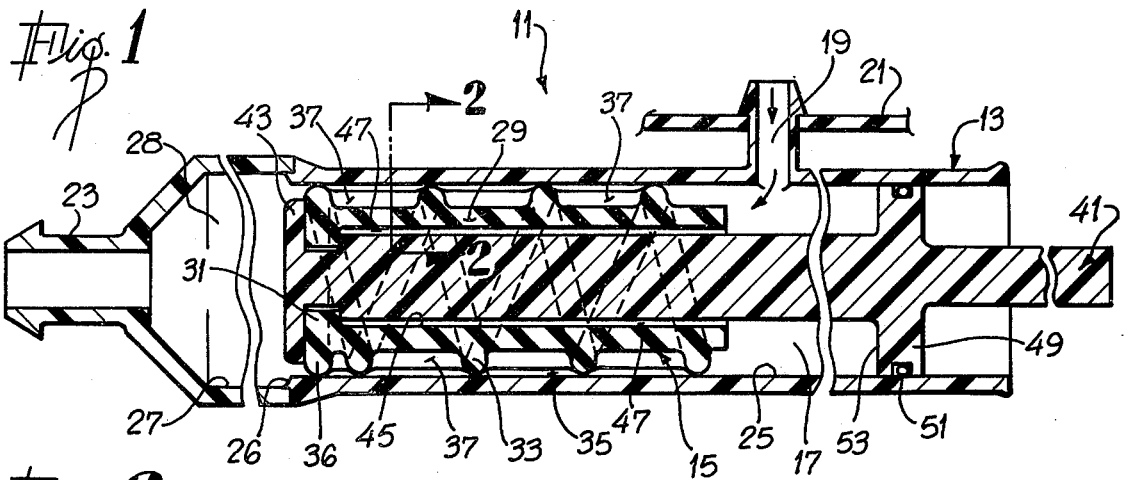

DRIP IRRIGATION VALVE WITH HELICAL FLOW PATH

BACKGROUND OF THE INVENTION

Drip irrigation involves slowly metering various agricultural fluids, such as water, adjacent each plant which is to be grown. Normally, the metering of these fluids is carried out over a relatively long time period. Drip irrigation conserves water, minimizes weed growth and enables various agricultural liquids such as fertilizers to be fed through the irrigation system.

It is very important that the flow rate for drip irrigation systems be adjustable. For example, where drip irrigation is used in an orchard, more water must be applied as the trees grow. A conventional technique is to increase the number of emitter valves at the base of each of the trees as the trees grow. However, this unnecessarily duplicates the emitter valves and require significant labor cost to install the additional valves.

Valves which can be used to adjust the flow rate are not novel per se, as evidenced, for example, by Prosser U.S. Pat. No. 3,322,145 and Toeppen U.S. Pat. No. 3,341,168. However, neither of these patented valves is a drip irrigation valve and both are relatively complex.

With drip irrigation, it is important that the water be accurately metered. Unfortunately, water sources often provide water at fluctuating pressures, which, if ignored, would significantly effect flow rate onto the plant. In addition, when field and irrigation lines are on a slope, more pressure is available at the lower elevations than at the higher elevations.

To provide pressure control, master pressure regulators can be used, but these increase the cost of the irrigation system. Pressure compensating emitter valves, such as the valves shown in Rondas U.S. Pat. No. 3,693,888 can be used. However, the patented valve has minute passages which are subject to clogging. In addition, the patented construction has no means for manually adjusting the flow rate.

SUMMARY OF THE INVENTION

My copending application Ser. No. 546,548 filed on Feb. 3, 1975 and entitled FLOW CONTROL VALVE and my copending application Ser. No. 596,222 filed on July 16, 1975 entitled DRIP IRRIGATION VALVE show several embodiments of pressure compensating emitters in which the flow rate can be adjusted. The present invention is also directed to a drip irrigation valve which combines pressure compensating features with adjustable flow control. However, the present invention is characterized by the novel and advantageous ways in which pressure compensation and flow control are obtained. In addition, the present invention provides a self-cleaning feature, and this is of particular importance in drip irrigation valves where the flow passage is necessarily very small so as to maintain a relatively low flow rate.

As used herein with reference to drip irrigation valves, the expression "pressure compensating" means an ability to increase the restriction to flow in response to inlet pressure increases. The expression pressure compensating as used herein does not necessarily mean that the flow rate through the valve will be totally immune to inlet pressure fluctuations.

A valve constructed in accordance with the teachings of this invention includes an outer member having a passageway and an inner member in the passageway with the members being relatively axially movable. To provide a flow passage through the valve, an axially and circumferentially extending rib is provided on a first of the members. The rib cooperates with a confronting peripheral surface section of the second member to define the flow passage. The flow passage has a plurality of turns with each of the turns extending at least part way around the inner member.

To obtain a long flow passage without increasing the size of the valve, the flow passage extends around the inner member in a path which may be helical. The flow passage may be of small cross sectional area and provide substantial resistance to fluid flow. Alternatively or in addition, means may be provided for defining a plurality of restrictions in the flow passage. For example, each of the restrictions may include a wall or dam extending between adjacent turns of the rib. To promote self cleaning, the dams should be resilient.

To provide for flow control, means is provided for changing the resistance to flow through the flow passage. This can be accomplished by changing the length of the flow passage. In addition the number of restrictions in the flow path can be changed. This can be accomplished by providing first and second peripheral surface sections on the second member. The rib is engageable with the first peripheral surface section to the extent that the rib is substantially radially aligned with the first peripheral surface section. This cooperation between the rib and the first peripheral surface section defines the flow passage. However, the rib is not engageable with the second peripheral surface section. Accordingly, by changing the relative axial positions of the members the length of the flow passage and the number of restrictions in the flow passage can be varied. This in turn provides control over the flow rate through the flow passage.

Either the inner member or the outer member can have the rib and the restrictions. If the inner member has the rib, then the second peripheral surface section forms an enlargement of the passageway through the outer member. If the outer member has the rib, then the second peripheral surface section defines a region of reduced cross section on the inner member. In either event, relative axial movement between the members provides the desired flow rate control.

If the flow passage becomes clogged at one of the restrictions, pressure builds up upstream of this restriction while the downstream pressure reduces. The differential pressure across the particle causing the restriction tends to move the particle downstream toward the outlet. In addition, by making the dam which forms the restriction somewhat resilient, there is a tendency of the dam to release a trapped particle in response to this increase in differential pressure across the particle.

Flushing can be easily accomplished by relatively axially moving the members so that the rib is entirely out of contact with the other member. A shut off position is also provided.

To make the valve pressure compensating, at least a portion of one of the members is made of resilient material. Means including such portion of this member define a chamber which is open to fluid at valve inlet pressure. Accordingly, the resilient portion of the member is deformed an amount which is related to the inlet pressure. The resilient deformation of the resilient portion varies the effective cross sectional area of the flow passage at the restrictions and elsewhere. Thus, the relationship between inlet pressure and the resistance to fluid flow through the flow passage is established.

If the inner member is the resilient member, the chamber can advantageously lie at least partially within the inner member. If the outer member is the resilient member then the chamber should lie radially outwardly of the outer member.

The flow control and pressure compensating features of this invention are usable separately or in combination.

The invention can best be understood by reference to the following description taken in connection with the accompanying illustrative drawing.

BRIEF DESCRIPTION OF THE DRAWING

FIG. 1 is a longtitudinal sectional view through one form of drip irrigation valve constructed in accordance with the teachings of this invention with the valve in the closed position.

FIG. 1A is a fragmentary sectional view showing a portion of FIG. 1 with the valve in an open position.

FIG. 2 is an enlarged fragmentary sectional view taken generally along line 2—2 of FIG. 1.

FIG. 3 is a longitudinal sectional view taken on an axial plane through a second form of drip irrigation valve constructed in accordance with the teachings of this invention.

FIG. 4 is an enlarged fragmentary sectional view taken generally along line 4—4 of FIG. 3.

FIGS. 5 and 6 are fragmentary sectional views showing different ways in which restricted orifices can be provided.

DESCRIPTION OF THE PREFERRED EMBODIMENTS

FIGS. 1 and 2 show a drip irrigation valve 11 which includes an outer member 13 and an inner member 15. The outer member 13 is in the form of a tube and may be constructed of rigid molded plastic material. The outer member 13 is tubular and has an axially extending passageway 17. A fluid such as water can be supplied to the passageway 17 in any suitable manner such as by a barbed inlet 19 which may be attached to a hose 21 or other suitable fluid source. The outer member 13 also provides a barbed outlet 23.

The outer member 13 has inner peripheral surface sections 25 and 27 interconnected by a transition section 26. Although various configurations are possible, in the embodiment illustrated both of the surface sections 25 and 27 are cylindrical. The diameter of the surface section 27 is greater than the diameter of the surface section 25. The surface section 27 defines an enlargement 28 of the passageway 17.

The inner member 15 is preferably molded of a resilient deformable material such as rubber. The inner member 15 is tubular and includes a peripheral wall 29 and an end wall 31. A helical rib 33 is formed integrally on the exterior of the peripheral wall 29, and it extends axially and circumferentially along the inner member 15. The rib 33 preferably winds around the inner member 15 a plurality of times. In the position shown in FIG. 1, the rib 33 sealingly engages the surface section 25 of the outer member 13. Thus, the surface section 25 cooperates with the confronting surface of the inner member 15 to define a fluid or flow passage 35 which, in the embodiment illustrated, is helical. Although a helical flow passage is preferred, it should be understood that any flow passage which extends both axially and circumferentially of the inner member 15 may be used. Also, the number of times the flow passage 35 winds around the inner member 15 will depend upon the desired length of the flow passage.

The rib 33 terminates at the end of the valve 11 remote from the inlet 19 in an annular flange 36 which lies in a radial plane. The diameter of the flange 36 is larger than the diameter of the passage section 25 and smaller than the diameter of the passage section 27. The flange 36 is adapted to sealingly engage the section 25 to provide a shut off position as shown in FIG. 1.

A plurality of resilient dams 37 extend between adjacent turns of the rib 33 to reduce the effective cross sectional area of the flow passage 35 and provide added resistance to fluid flow. It should be understood that the restriction to fluid flow through the flow passage 35 could be provided in various different ways and the dams 37 are purely illustrative. In the embodiment illustrated, the dams 37 extend axially along the peripheral wall 29, and they are equally spaced. Each of the dams 37 extends radially outwardly from the peripheral wall 29 to define along with the surface section 25 a restricted orifice 39. Any number of the dams 37 can be provided; however, it is preferred to distribute the dams throughout substantially the full length of the flow passage 35. Although the dams 37 could be of different sizes and shapes, in the embodiment illustrated all of the dams are identical.

A stem 41 which may be constructed of rigid plastic material is suitably attached to the inner member 15. In the embodiment illustrated, the stem 41 projects through an opening in the end wall 31 and is suitably attached thereto by a head 43 on the stem. The inner member 15 has an axial passage 45 which extends completely through it. The stem 41 extends from the end wall 31 completely through the passage 45 to a location outside the outer member 13. The stem 41 cooperates with the inner member 15 to define an annular chamber 47 within the inner member 15.

Although the rib 33 sealingly engages the surface section 25, the inner member 15 can be moved axially relative to the outer member 13. This can be accomplished manually by the stem 41. The stem 41 also carries a piston 49 and a seal 51 which seals off the righthand end of the outer member 13. The piston 49 has a face 53 which faces one end of the inner member 15.

With the valve in the position shown in FIG. 1A, fluid such as water under pressure is admitted to the passageway 17 from the inlet 19. The water under pressure flows from the passageway 17 into the righthand end of the flow passage 35, through the flow passage 35, and the passageway enlargement 28 to the outlet 23. Water at inlet pressure also enters and fills the chamber 47.

The resistance to fluid flow provided in the flow passage 35 is a function of the relative axial position of the outer member 13 and the inner member 15 and the inlet water pressure. Considering first the relative axial position of the members 13 and 15, the flow of water through the flow passage 35 is resisted by the flow passage itself and the restricted orifices 39. To shorten the flow passage 35 and to remove some of the dams 37 from the flow passage, the stem 41 is moved to the left to thereby move the inner member 15 to the left from the position shown in FIG. 1A. This places some of the rib 33 and the dams 37 in the enlargement 28. The diameter of the enlargement 28 is sufficiently large so that the surface section 27 does not engage the rib 33.

This reduces the resistance to fluid flow through the flow passage 35. The flow passage 35 terminates at the left end of the surface section 25 regardless of the relative axial position of the members 13 and 15.

To reduce fluid flow, the inner member 15 is moved to the right from the position shown in FIG. 1A to thereby increase the length of the flow passage 35 and increase the number of the dams 37 in the flow passage. In this manner, the flow rate through the valve 11 from the inlet 19 to the outlet 23 can be established. By relatively moving the members 13 and 15 to place the flange 36 in engagement with the section 25 (FIG. 1), a complete blockage of flow through the flow passage 35 is obtained.

In order to maintain the flow rate established by the relative axial position of the members 13 and 15 independently of fluid pressure fluctuations at the inlet 19, the peripheral wall 29 is made resilient and water at inlet pressure is admitted to the chamber 47. Thus, the interior of the peripheral wall 29 is subjected to water at supply pressure whereas the exterior of the peripheral wall 29 is subjected at the right end to fluid at supply pressure and at the left end to fluid at discharge or outlet pressure. Intermediate regions of the exterior of the peripheral wall 29 are subjected to water at a pressure intermediate supply and discharge pressure. Because supply pressure exceeds discharge pressure, the pressure within the chamber 47 is greater than the pressure acting on the exterior of the peripheral wall 29 over most of the length of the peripheral wall.

If the water pressure at the inlet 19 increases, the pressure in the chamber 47 immediately increases a corresponding amount. This occurs before pressure in the flow passage 35 can build up. Accordingly, the pressure differential across the peripheral wall 29 also increases. This causes the resilient peripheral wall 29 and the dams 37 to be urged radially outwardly toward the surface section 25 and this reduces the cross sectional area of the flow passage 35 particularly at the restricted orifices 39.

Conversely, a decrease in water pressure at the inlet 19 reduces the differential pressure across the peripheral wall 29 and increases the effective cross sectional area of the restricted orifices 39. By appropriately selecting the resilience of the peripheral wall 29, the effect of pressure fluctuations at the inlet 19 on the flow rate through the valve 11 can be reduced or substantially eliminated.

If one of the restricted orifices 39 of the helical flow passage 35 should become clogged with particulate matter, the pressure upstream will build up to substantially inlet pressure. This would increase the pressure differential across the clogged orifice 39 thereby tending to dislodge the particulate matter. In addition, this pressure differential across the dam tends to resiliently flex the dam to free the particulate matter. Finally, the pressure differential across the portion of the peripheral wall 29 upstream of the clogged orifice 39 would be reduced with the result that the peripheral wall 29 and the dams 37 would tend to move radially inwardly to enlarge the orifices 39 and allow the particulate matter causing the clogging to escape. This action would be repeated at each of the orifices 39 until the particulate matter had passed completely through the flow passage 35. In the embodiment of FIGS. 1 and 2, equal pressure inside and outside of the peripheral wall 29 would result in a slight force differential acting radially inwardly due to the larger area of the external surface of the peripheral wall.

If each of the orifices 39 are of the same size and shape in the unpressurized condition, then the pressure differential which occurs during use across the peripheral wall 29 will result in the orifices 39 being of progressively smaller cross sectional area as they extend toward the outlet 23. This is due to the greater differential pressure across the peripheral wall 29 adjacent the outlet end of the flow passage 35. This relationship can be changed by changing the radial dimensions of the dam 37. The rib 33 should be sized to seal against the surface section 25 at all reasonably anticipated pressure differentials across the peripheral wall 29.

The water under pressure acting on the inner member 15 tends to move the inner member to the left as viewed in FIG. 1. The effective area of the face 53 of the piston 49 is selected to balance this pressure. Because the piston 49 is connected by the stem 41 to the inner member 15, the net fluid force on the inner member 15 tending to move it axially substantially zero.

FIGS. 3 and 4 show a valve 11a which is similar to the valve 11. Portions of the valve 11a corresponding to portions of the valve 11 are designated by corresponding reference numerals followed by the letter a.

The primary difference between the valves 11 and 11a is that in the latter the outer member 13a has the helical rib 33a and the dams 37a, and the inner member 15a, has the peripheral surface sections 25a and 27a. The outer member 13a is constructed of resilient material and the inner member 15a is constructed of relatively rigid plastic material. Thus, the basic functions of the outer member and inner member are reversed.

The outer member 13a has a resilient peripheral wall 29a and the rib 33a is formed integrally on the internal surface of the peripheral wall. The dams 37a extend axially between adjacent convolutions of the rib 33a as described above with reference to the valve 11. The outer member 13a has an axial passage which extends through it and an annular flange 55 is provided integrally with the peripheral wall 29a at one end of the peripheral wall. The flange 55 extends inwardly to the same extent as the rib 33a. The member 13a also has an annular external flange 56.

The inner member 15a is in the form of a stepped rod with the surface 25a forming a large diameter portion which is sealingly engageable with the rib 33a. The surface section 27a forms a small diameter portion which is sufficiently small in cross sectional areas so as to be not engageable with either the rib 33a or the flange 55. A transition surface 58 section joins the surface sections 25a and 27a and may be considered as a part of either of them.

With the valve 11a, some of the features of the stem 41 (FIGS. 1 and 2) have been incorporated into the inner member 15a. For example, the inner member 15a carries the piston 49a. The inner member 15a also provides an inlet 57 which can communicate with a hose 21a.

The valve 11a also includes a housing 59, which in the embodiment illustrated includes two housing sections 60 and 60' appropriately joined as by gluing. The housing 59 has a peripheral wall 61 which cooperates with the peripheral wall 29a of the outer member 13a to define an annular chamber 47a which surrounds the peripheral wall 29a. One end of the housing 59 defines a cylinder 63 for slidably mounting the piston 49a. The outlet 23a is provided at the opposite end of the housing 59. The housing 59 provides an internal annular recess for receiving the flange 56 to hold the member 13a in position relative to the housing 59.

The valve 11a has the same flow control and pressure compensating features as does the valve 11, and it can be operated in the same way. Specifically, the length of the flow passage 35a and the number of restricted orifices 39a in the flow passage is controlled by the relative axial position of the members 13a and 15a. To reduce the length of the flow passage 35a and to reduce the number of the restricted orifices 39a, the outer member 13a is moved to the right from the position shown in FIG. 3 to move more of the rib 33a out of engagement with the surface section 25a. Conversely, by moving the outer membr 13a to the left as viewed in FIG. 3, an additional length of the rib 33a is brought into sealing contact with the surface section 25a to thereby increase the resistance to flow.

Pressure compensation is obtained because the peripheral wall 29a is resilient and because the chamber 47a is open to fluid at supply pressure. By moving the outer member 13a to the left to bring the flange 55 into contact with the surface section 25a, complete shut off of fluid flow through the valve 11a is obtained. The face 53a of the piston 49a is sized to achieve a substantially zero net fluid force in the axial direction on the inner member 15a.

FIGS. 5 and 6 show valves 11b and 11c which are identical to the valve 11 in every way except the manner in which restricted orifices 39b and 39c are formed. Portions of the valves 11b and 11c corresponding to portions of the valve 11 are designated by corresponding reference numerals followed by the letter b and c, respectively.

In the valve 11b, the dam 37b extends radially outwardly into engagement with the surface section 25b. However, the dam 37b has a notch or groove which cooperates with the surface section 25b to define the restricted orifice 39b. The notch can be of various different configurations.

The valve 11c is identical to the valve 11b except that the dam 37c has no notch and an internal groove is formed in the surface section 25c. This internal groove cooperates with the dam 37c to define the restricted orifice 39c. The modifications shown in FIGS. 5 and 6 are also applicable to a construction of the type shown in FIGS. 3 and 4.

Although exemplary embodiments of the invention have been shown and described, many changes, modifications and substitutions may be made by those with ordinary skill in the art without necessarily departing from the spirit and scope of this invention.

I claim:
1. A drip irrigation valve comprising:
an outer member having a passageway;
an inner member in said passageway of said outer member, said members being relatively axially movable;
an axially and circumferentially extending rib on a first of said members;
a second of said members having first and second peripheral surface sections;
said rib being engageable with the first peripheral surface section to the extent that said rib substantially radially confronts said first peripheral surface section to define a flow passage, said members being positionable so that the flow passage has a plurality of turns with each of said turns extending at least part way around the inner member;
means for admitting fluid under pressure to one end of the flow passage whereby the fluid can flow through the flow passage and be discharged at the other end of the flow passage; and
said rib being out of engagement with the second peripheral surface section whereby the flow passage terminates at the second peripheral surface section and the length of the flow passage and the flow rate through said flow passage can be varied by relatively axially moving the members to change the axial position of said rib relative to said first and second peripheral surface sections.

2. A valve as defined in claim 1 including means for varying the resistance to flow through said flow passage in response to changes in the pressure in the fluid at the admitting means.

3. A valve as defined in claim 1 including means for defining a plurality of restrictions in said flow passage, said restrictions being spread throughout a major region of the flow passage whereby flow through said flow passage is retarded.

4. A valve as defined in claim 3 wherein at least one of said restrictions includes a resilient wall on said first member extending substantially between adjacent turns of said rib.

5. A valve as defined in claim 3 wherein said restrictions are on said first member, one of said restrictions being on a portion of said first member, said portion of said first member being resiliently deformable in a direction to vary the effective cross sectional area of the flow passage, said valve including means including said portion of said first member for defining a chamber, and said chamber being communicable with the admitting means to receive fluid under pressure from the admitting means whereby said portion of said first member is subject to being resiliently deformed an amount which is related to the pressure of the fluid at the admitting means to thereby vary the effective cross sectional area of the flow passage at said one restriction.

6. A valve as defined in claim 1 wherein said first member is said inner member, said first and second peripheral sections at least partially define said passageway, and said second peripheral surface section defines an enlargement of said passageway into which at least portions of said inner member and said rib are movable to reduce the length of the flow passage and the resistance to flow through said flow passage.

7. A valve as defined in claim 3 wherein said inner member has a resiliently deformable peripheral wall and said rib is on the exterior of said resiliently deformable peripheral wall, at least some of said restrictions are on the exterior of said peripheral wall of said inner member, and said inner member has a chamber therein adapted to receive fluid under pressure from the admitting means so that the fluid under pressure can tend to radially expand said peripheral wall.

8. A valve as defined in claim 7 wherein said inner member includes an end wall, said valve includes a stem connected to said end wall and projecting through said inner member to define said chamber therewith, a piston on said stem, said admitting means including a region of said passageway between said piston and one end of said rib, the effective area of said piston being selected to substantially balance the fluid forces acting axially on said inner member.

9. A valve as defined in claim 1 wherein said first member is said outer member, said first and second peripheral surface sections define at least a portion of the outer periphery of said inner member, and said second peripheral surface section defines a region of said inner member of reduced cross sectional area.

10. A valve as defined in claim 9 wherein said outer member has a resiliently deformable peripheral wall and said rib is on the interior of said resiliently deformable peripheral wall, said valve includes a plurality of restrictions in said flow passage, at least one of said restrictions is on the interior of said peripheral wall and said valve includes a member surrounding said peripheral wall and cooperating therewith to define a chamber, said chamber being adapted to receive fluid under pressure from the admitting means so that the fluid under pressure can tend to deform said peripheral wall radially inwardly.

11. A pressure compensating drip irrigation valve comprising:
  an outer member having a passageway;
  an inner member in said passageway of said outer member, said members having confronting surfaces;
  first means on the confronting surfaces of said members for defining a flow passage extending axially and circumferentially of the inner member said first means including a circumferentially extending rib which extends around said inner member a plurality of turns;
  a plurality of resilient dams on at least one of the members for at least partially defining a plurality of restrictions in said flow passage with at least some of said restrictions being in series whereby flow through said passage is retarded;
  at least a portion of a first of said members being resiliently deformable in a direction to vary the effective cross sectional area of the flow passage;
  means including said portion of said first member for defining a chamber;
  means for admitting fluid under pressure to said flow passage;
  means defining an outlet communicating with said flow passage whereby the fluid can flow from the admitting means through said flow passage to the outlet; and
  said chamber being communicable with the admitting means to receive fluid under pressure from the admitting means whereby said portion of said first member is subject to being resiliently deformed an amount which is related to the pressure of the fluid at the admitting means to thereby vary the effective cross sectional area of said flow passage.

12. A valve as defined in claim 11 wherein said first member is said inner member and said chamber is within said inner member, said portion of said inner member including a peripheral wall of said inner member.

13. A valve as defined in claim 12 wherein said rib extends axially and circumferentially along the exterior of said peripheral wall and said dams are carried by said peripheral wall, and the resilient movement of the peripheral wall varies the cross sectional area of the flow passage at least at some of said restrictions.

14. A valve as defined in claim 11 wherein said first member is said outer member and said portion of said first member includes a peripheral wall of said outer member, said confronting surfaces including an inner surface of the peripheral wall and an outer surface of said inner member, said chamber being radially outwardly of said peripheral wall.

15. A valve as defined in claim 14 wherein said rib extends axially and circumferentially along the inner surface of the peripheral wall and said dams are carried by said outer member, and the resilient movement of the peripheral wall varies the cross sectional area of the flow passage at least at some of said restrictions.

16. A valve as defined in claim 11 including manually adjustable means for varying the resistance to fluid flow through said flow passage.

17. A valve as defined in claim 11 wherein said first member has a resilient peripheral wall and said portion of said first member includes said peripheral wall of the first member, said flow passage being on one side of said peripheral wall and said chamber being on the other side of said peripheral wall.

18. A valve as defined in claim 1 including a peripheral flange on one of said members, said peripheral flange being engageable with the other of said members in at least one relative axial position of said members to block flow through the flow passage.

19. A drip irrigation valve for fluid under pressure comprising:
  means defining a fluid passage having a fluid passage inlet and a fluid passage outlet, said fluid passage inlet being adapted to receive the fluid under pressure;
  said fluid passage having opposed surface regions on opposite sides of the fluid passage;
  said means including a plurality of resilient walls in said fluid passage, each of said walls extending from one of said surface regions toward the other of said surface regions to define therewith a restricted orifice;
  at least some of said orifices being arranged in series whereby fluid flowing through the fluid passage can pass through a plurality of said orifices and be subjected to pressure drops; and
  each of said walls being of sufficient resilience to flex in response to an upstream pressure increase resulting from clogging of the associated orifice whereby the fluid passage is self-cleaning.

20. A drip irrigation valve as defined in claim 19 including means for varying the length of the fluid passage between the fluid passage inlet and the fluid passage outlet to thereby vary the number of said orifices in the fluid passage and the flow rate through the fluid passage.

21. A drip irrigation valve as defined in claim 19 wherein said means includes a resilient wall defining at least a portion of said fluid passage, said resilient wall having a surface outside of said fluid passage, means for exposing said surface of said resilient wall to substantially the pressure of the fluid which exists at said fluid passage inlet whereby any increase in the pressure of the fluid at the fluid passage inlet resiliently moves said wall inwardly to increase the restriction to flow through the fluid passage.

22. A drip irrigation valve as defined in claim 21 including means for varying the length of the fluid passage between the fluid passage inlet and the fluid passage outlet to thereby vary the number of said orifices in the fluid passage and the flow rate through the fluid passage.

23. A drip irrigation valve as defined in claim 19 wherein said means includes first and second relatively movable members, one of said members being resilient and having said resilient walls thereon.

24. A drip irrigation valve as defined in claim 19 wherein at least one of said walls engages said other surface regions of the fluid passage, at least one of said one wall and said other surface region having a groove therein to provide for fluid flow across said one wall.

25. A drip irrigation valve as defined in claim 19 wherein at least one of said walls has an upstream face, substantially all of said upstream face being uncovered and exposed to fluid under pressure in the fluid passage.

26. A drip irrigation valve as defined in claim 19 wherein at least one of said resilient walls terminates in an end which confronts said other surface region of said fluid passage, at least one of said resilient wall and said other surface region having a groove therein to at least partially provide the restricted orifice at said one wall.

27. A drip irrigation valve as defined in claim 26 wherein said groove is in said other surface region.

28. A drip irrigation valve as defined in claim 19 wherein at least one of said walls has an upstream face, substantially all of said upstream face being uncovered at least when no fluid flows in the fluid passage.

29. A drip irrigation valve for fluid under pressure comprising:
  means defining a fluid passage having a fluid passage inlet and a fluid passage outlet, said fluid passage inlet being adapted to receive the fluid under pressure;
  said fluid passage having opposed surface regions on opposite sides of the fluid passage;
  said means including a plurality of resilient walls in said fluid passage, each of said walls extending at least substantially completely between said surface regions of the fluid passage and terminating in an end closely adjacent one of the opposed surface regions;
  each of the resilient walls defining with the adjacent opposed surface region a restricted orifice;
  at least two of said orifices being arranged in series whereby fluid flowing through the fluid passage can pass through a plurality of said orifices and be subjected to pressure drops; and
  each of said walls being of sufficient resilience to flex in response to an upstream pressure increase resulting from clogging of the associated orifice whereby the fluid passage is self-cleaning.

30. A drip irrigation valve as defined in claim 29 wherein at least one of said resilient walls has a groove opening at said end thereof to at least partially define the associated restricted orifice.

31. A drip irrigation valve as defined in claim 29 wherein the surface region of said fluid passage which is adjacent said end of one of said resilient walls has a groove therein to at least partially define the associated restricted orifice, said groove opening at said end.

32. A drip irrigation valve as defined in claim 29 wherein said fluid passage is generally helical.

33. A drip irrigation valve as defined in claim 29 wherein said opposed surface regions are rigid whereby a first of said restricted orifices is defined by one of the resilient walls and the adjacent rigid surface region.

* * * * *